(12) United States Patent
Johnson et al.

(10) Patent No.: US 10,947,902 B2
(45) Date of Patent: Mar. 16, 2021

(54) FUEL NOZZLE, FUEL SUPPLY ASSEMBLY THEREOF, AND METHOD OF ASSEMBLING A FUEL NOZZLE

(71) Applicant: General Electric Company, Schenectady, NY (US)

(72) Inventors: Thomas Edward Johnson, Greer, SC (US); Kaitlin Marie Graham, Greenville, SC (US); Geoffrey David Myers, Simpsonville, SC (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 627 days.

(21) Appl. No.: 15/621,347

(22) Filed: Jun. 13, 2017

(65) Prior Publication Data

US 2018/0355800 A1    Dec. 13, 2018

(51) Int. Cl.
*F02C 7/22*    (2006.01)
*F23R 3/28*    (2006.01)
*F02C 7/232*   (2006.01)

(52) U.S. Cl.
CPC .............. *F02C 7/222* (2013.01); *F23R 3/286* (2013.01); *F02C 7/232* (2013.01)

(58) Field of Classification Search
CPC .......... F02C 7/222; F23R 3/286; F23R 3/283; F23R 3/343; F23R 3/36
See application file for complete search history.

(56) References Cited

U.S. PATENT DOCUMENTS

| 2,583,416 | A | 1/1952 | Clarke et al. |
| 6,174,161 | B1 | 1/2001 | Slavejkov et al. |
| 10,082,082 | B2 * | 9/2018 | Spivey ................... F02C 7/222 |
| 2015/0330348 | A1 | 11/2015 | Mulye et al. |

FOREIGN PATENT DOCUMENTS

EP    0 728 989 A2    8/1996

OTHER PUBLICATIONS

Copy of Extended European Search Report and Opinion issued in connection with corresponding EP Application No. 18175504.2 dated Oct. 4, 2018.

* cited by examiner

*Primary Examiner* — Andrew H Nguyen
*Assistant Examiner* — Stephanie Cheng
(74) *Attorney, Agent, or Firm* — Dority & Manning, P.A.

(57) ABSTRACT

An inlet manifold includes a main inlet oriented along a first direction and a pilot inlet oriented along a second direction perpendicular to the first direction. A wye passage includes an inlet branch in fluid communication with the main inlet. The inlet manifold also includes a first main passage in fluid communication with a first outlet branch of the wye passage and a second main passage in fluid communication with a second outlet branch of the wye passage. The first main passage extends generally along the first direction between the wye passage and a first main outlet. The second main passage extends generally along the first direction between the wye passage and a second main outlet. The inlet manifold also includes a pilot passage in fluid communication with the pilot inlet. The pilot passage extends generally along the first direction between the pilot inlet and a pilot outlet.

9 Claims, 9 Drawing Sheets

FUEL NOZZLE, FUEL SUPPLY ASSEMBLY THEREOF, AND METHOD OF ASSEMBLING A FUEL NOZZLE

FIELD

The present disclosure generally involves a fuel nozzle. More specifically, the disclosure relates to a fuel supply assembly for a fuel nozzle and related methods.

BACKGROUND

Gas turbines generally operate by combusting a fuel and air mixture in one or more combustors to create a high-energy combustion gas that passes through a turbine, thereby causing a turbine rotor shaft to rotate. The rotational energy of the rotor shaft may be converted to electrical energy via a generator coupled to the rotor shaft. Each combustor generally includes fuel nozzles that provide for premixing of the fuel and air upstream of a combustion zone, as a means to keep nitrogen oxide (NOx) emissions low.

Gaseous fuels, such as natural gas, often are employed as a combustible fluid in gas turbine engines used to generate electricity. In some instances, it may be desirable for the combustion system to be able to combust liquid fuels, such as distillate oil. In a typical configuration, liquid fuel injection may be provided via a cartridge that extends within a center body of the fuel nozzle. While serving as an effective means for delivering the liquid fuel to the combustion zone of the combustor, the cartridge increases overall component count and cost of assembly.

BRIEF DESCRIPTION

Aspects and advantages are set forth below in the following description, or may be obvious from the description, or may be learned through practice.

According to one embodiment of the present disclosure, a fuel supply assembly for a fuel nozzle is provided. The fuel supply assembly includes an inlet manifold defining a longitudinal direction, a transverse direction, and a vertical direction, the longitudinal direction, the transverse direction, and the vertical direction are mutually perpendicular. The inlet manifold includes a main inlet oriented along the longitudinal direction and a pilot inlet oriented along the vertical direction. A wye passage includes an inlet branch in fluid communication with the main inlet of the inlet manifold. The inlet manifold also includes a first main passage in fluid communication with a first outlet branch of the wye passage and a second main passage in fluid communication with a second outlet branch of the wye passage. The first main passage extends generally along the longitudinal direction between the wye passage and a first main outlet. The second main passage extends generally along the longitudinal direction between the wye passage and a second main outlet. The inlet manifold also includes a pilot passage in fluid communication with the pilot inlet. The pilot passage extends generally along the longitudinal direction between the pilot inlet and a pilot outlet. A first main conduit is coupled to the first main outlet of the inlet manifold and a second main conduit is coupled to the second main outlet of the inlet manifold. The first main conduit extends between the inlet manifold and a fuel manifold. The second main conduit extends between the inlet manifold and the fuel manifold. The fuel manifold is in fluid communication with an air plenum for mixing fuel from the first main conduit and the second main conduit with air in the air plenum. A pilot conduit is coupled to the pilot outlet of the inlet manifold. The pilot conduit extends between the pilot outlet and a pilot tip. The pilot tip is positioned downstream of the fuel manifold.

According to another embodiment of the present disclosure, an inlet manifold is provided. The inlet manifold defines a first direction, a second direction, and a third direction, the first direction, the second direction, and the third direction are mutually perpendicular. The inlet manifold includes a main inlet oriented along the first direction and a pilot inlet oriented along the third direction. A wye passage is in fluid communication with the main inlet of the inlet manifold. The inlet manifold also includes a first main passage in fluid communication with the wye passage and a second main passage in fluid communication with the wye passage. The first main passage extends between the wye passage and a first main outlet. The second main passage extends between the wye passage and a second main outlet. The inlet manifold also includes a pilot passage in fluid communication with the pilot inlet. The pilot passage extends between the pilot inlet and a pilot outlet.

Another embodiment of the present disclosure is a method of assembling a fuel nozzle. The method includes attaching a first end of a main conduit to a fuel manifold. The method also includes attaching a second end of the main conduit to a main outlet of a central body of an inlet manifold. The method further includes attaching a first end of a pilot conduit to a pilot tip, the pilot tip downstream of the fuel manifold and attaching a second end of the pilot conduit to a pilot outlet of the central body of inlet manifold. The method then includes inserting the central body into a downstream end of a fuel nozzle, passing the central body upstream through the fuel nozzle and through an endcover until the pilot tip is proximate to the downstream end of the fuel nozzle, placing a removable flange onto a hub portion of the central body, and securing the removable flange to the endcover.

Those of ordinary skill in the art will better appreciate the features and aspects of such embodiments, and others, upon review of the specification.

BRIEF DESCRIPTION OF THE DRAWINGS

A full and enabling disclosure of the of various embodiments, including the best mode thereof to one skilled in the art, is set forth more particularly in the remainder of the specification, including reference to the accompanying figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Although exemplary embodiments of the present disclosure will be described generally in the context of a fuel nozzle assembly for a land based power generating gas turbine combustor for purposes of illustration, one of ordinary skill in the art will readily appreciate that embodiments of the present disclosure may be applied to any style or type of combustor for a turbomachine and are not limited to combustors or combustion systems for land based power generating gas turbines unless specifically recited in the claims.

Figure 1:
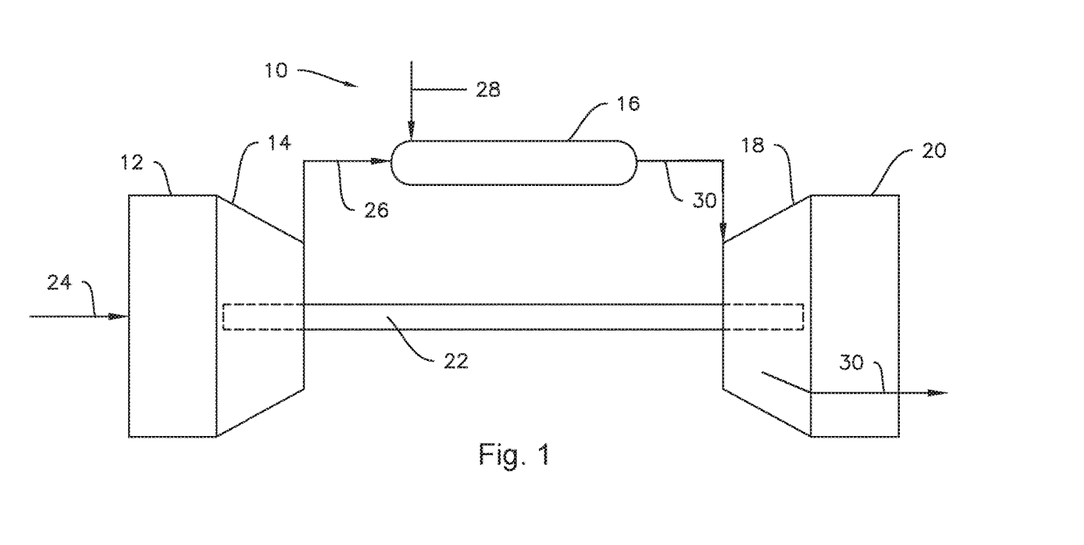
FIG. 1 is a functional block diagram of an exemplary gas turbine that may incorporate various embodiments of the present disclosure.

Referring now to the drawings, FIG. 1 illustrates a schematic diagram of an exemplary gas turbine 10. The gas turbine 10 generally includes an inlet section 12, a compressor 14 disposed downstream of the inlet section 12, at least one combustor 16 disposed downstream of the compressor 14, a turbine 18 disposed downstream of the combustor 16 and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustor 16. At least a portion of the compressed air 26 is mixed with a fuel 28 within the combustor 16 and burned to produce combustion gases 30. The combustion gases 30 flow from the combustor 16 into the turbine 18, wherein energy (kinetic and/or thermal) is transferred from the combustion gases 30 to rotor blades (not shown), thus causing shaft 22 to rotate. The mechanical rotational energy may then be used for various purposes such as to power the compressor 14 and/or to generate electricity. The combustion gases 30 exiting the turbine 18 may then be exhausted from the gas turbine 10 via the exhaust section 20.

Figure 2:
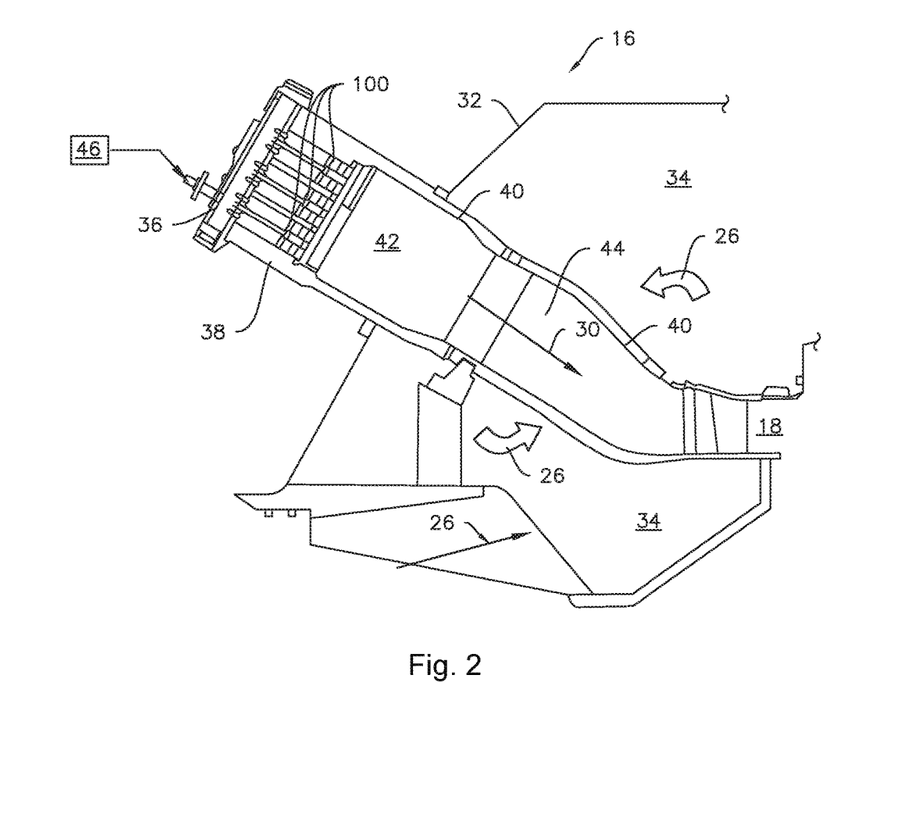
FIG. 2 is a simplified side section view of an exemplary combustor as may incorporate various embodiments of the present disclosure.

As shown in FIG. 2, the combustor 16 may be at least partially surrounded by an outer casing 32 such as a compressor discharge casing. The outer casing 32 may at least partially define a high pressure plenum 34 that at least partially surrounds various components of the combustor 16. The high pressure plenum 34 may be in fluid communication with the compressor 14 (FIG. 1) so as to receive the compressed air 26 therefrom. An end cover 36 may be coupled to the outer casing 32. In particular embodiments, the outer casing 32 and the end cover 36 may at least partially define a head end volume or portion 38 of the combustor 16.

In particular embodiments, the head end portion 38 is in fluid communication with the high pressure plenum 34 and/or the compressor 14. One or more liners or ducts 40 may at least partially define a combustion chamber or zone 42 for combusting the fuel-air mixture and/or may at least partially define a hot gas path 44 through the combustor, for directing the combustion gases 30 towards an inlet to the turbine 18.

In various embodiments, the combustor 16 includes at least one fuel nozzle 100. As shown in FIG. 2, the fuel nozzle 100 may be coupled to the end cover 36 and extend towards the combustion chamber 42. The one or more fuel nozzles 100 may include a fuel supply assembly 102 (FIG. 3) which is in communication with a liquid fuel supply 46. Various embodiments of the combustor 16 may include different numbers and arrangements of fuel nozzles 100 and is not limited to any particular number of fuel nozzles unless otherwise specified in the claims. For example, in particular configurations the one or more fuel nozzles 100 may include multiple fuel nozzles annularly arranged about a center fuel nozzle.

Figure 3:
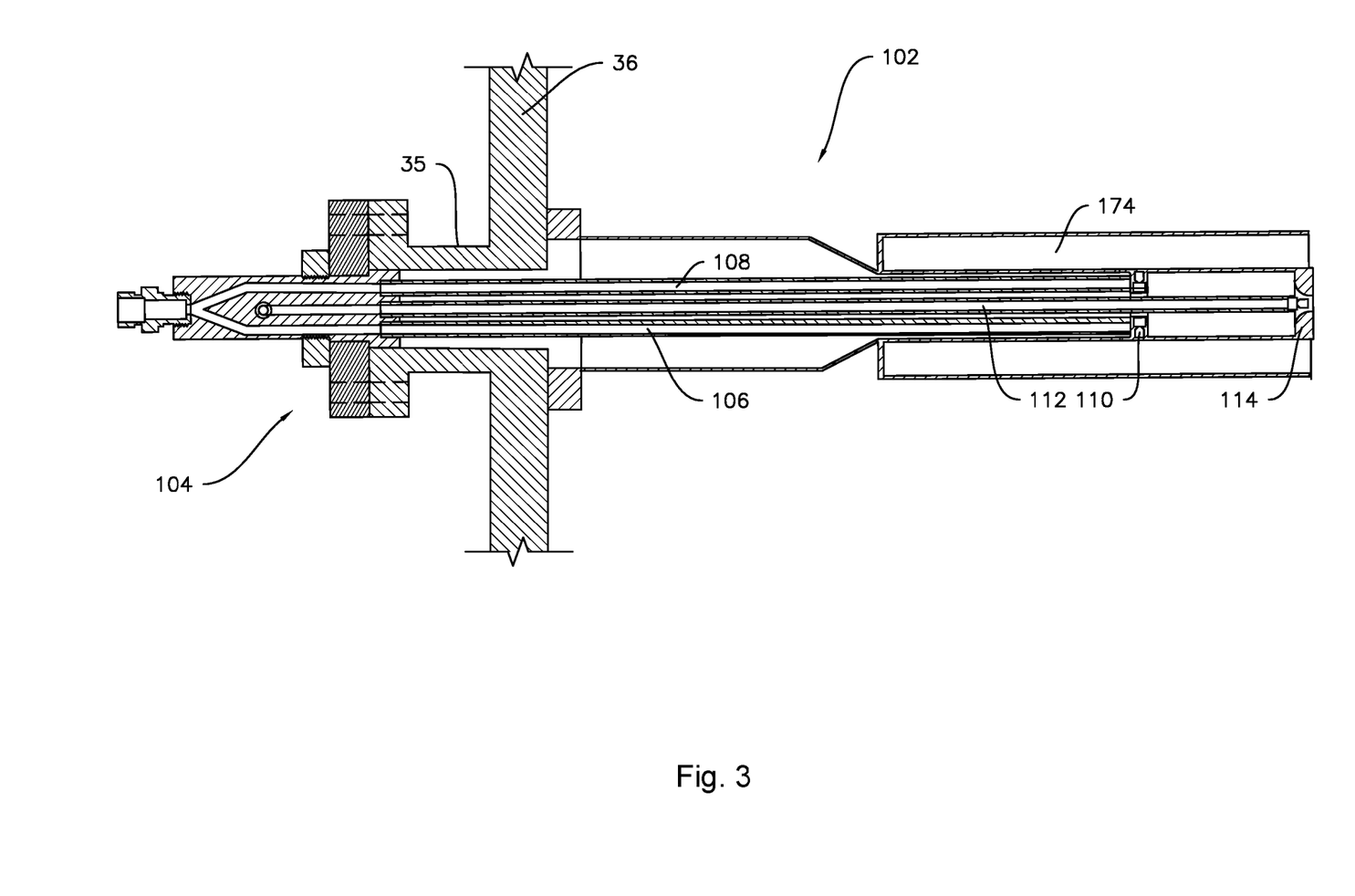
FIG. 3 is a side section view of a fuel nozzle according to at least one embodiment of the present disclosure.

FIG. 3 illustrates a fuel supply assembly 102 in an assembled condition within a fuel nozzle 100 (FIG. 2) according to some embodiments of the present disclosure. The fuel nozzle 100 may be connected to an inner surface of the end cover 36 via mechanical fasteners or by other connecting means (not shown). As seen in FIG. 3, the example fuel supply assembly 102 includes an inlet manifold 104 which may be coupled to a fuel port 35 in the end cover 36. Also illustrated in FIG. 3, a plurality of main conduits 106 and 108 may extend from the inlet manifold 104 to a fuel manifold 110, and a pilot conduit 112 may extend from the inlet manifold 104 to a pilot tip 114. The fuel manifold 110 may be in fluid communication with an air plenum 174 for mixing liquid fuel from the first main conduit 106 and the second main conduit 108 with air in the air plenum 174. For example, the fuel manifold 110 may be annular in shape, such that the fuel manifold 110 defines a circumference and a radius. The fuel manifold 110 may include a plurality of radially outwardly oriented atomizers 180 (FIG. 8) for spraying liquid fuel from the first main conduit 106 and the second main conduit 108 into the air plenum 174. The fuel supply assembly 102, and in particular the inlet manifold 104 thereof, may advantageously provide a supply of liquid fuel to the fuel nozzle 100 without the need for a cartridge.

Figure 4:
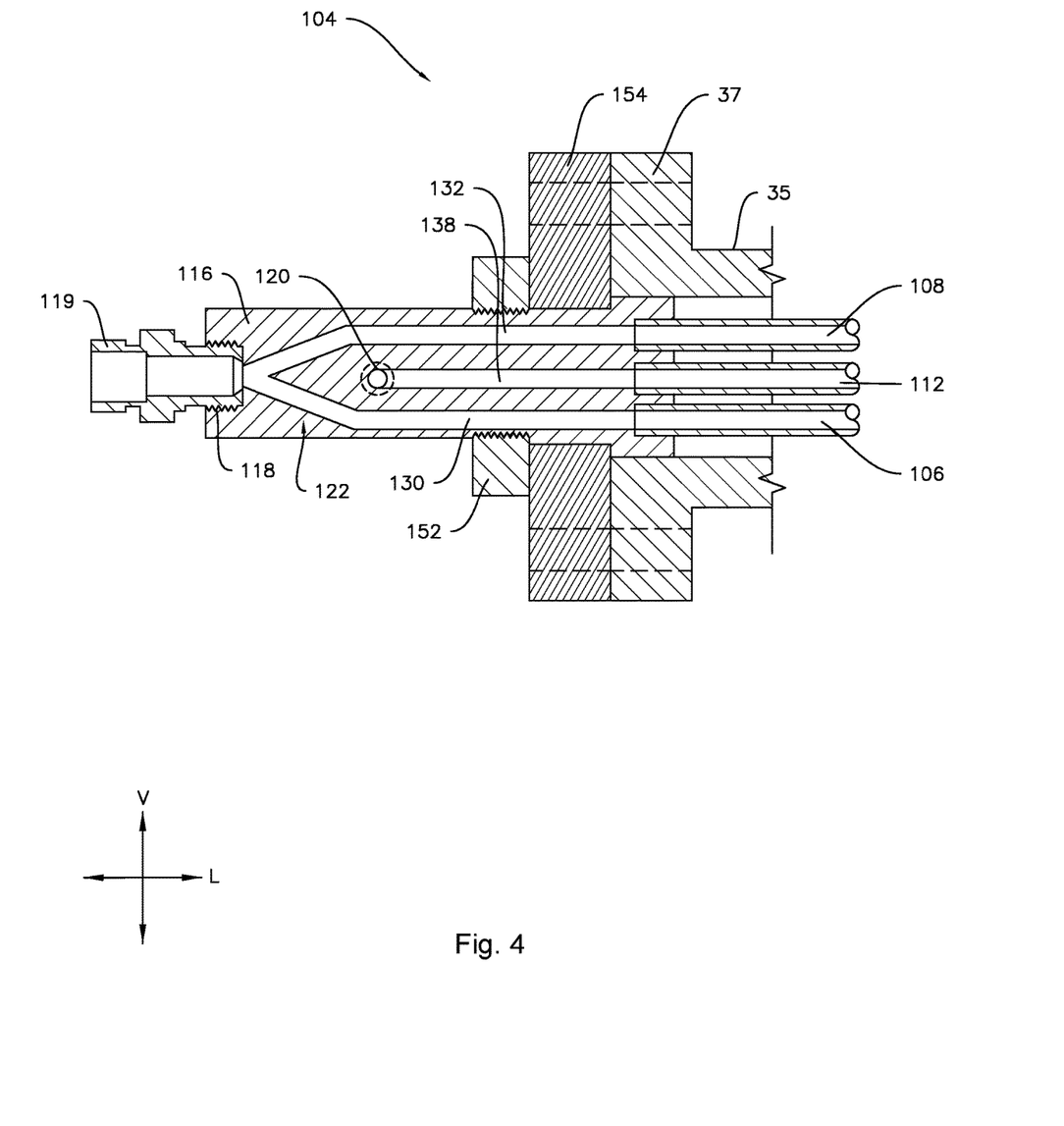
FIG. 4 is a side section view of an inlet manifold according to at least one embodiment of the present disclosure.
Figure 5:
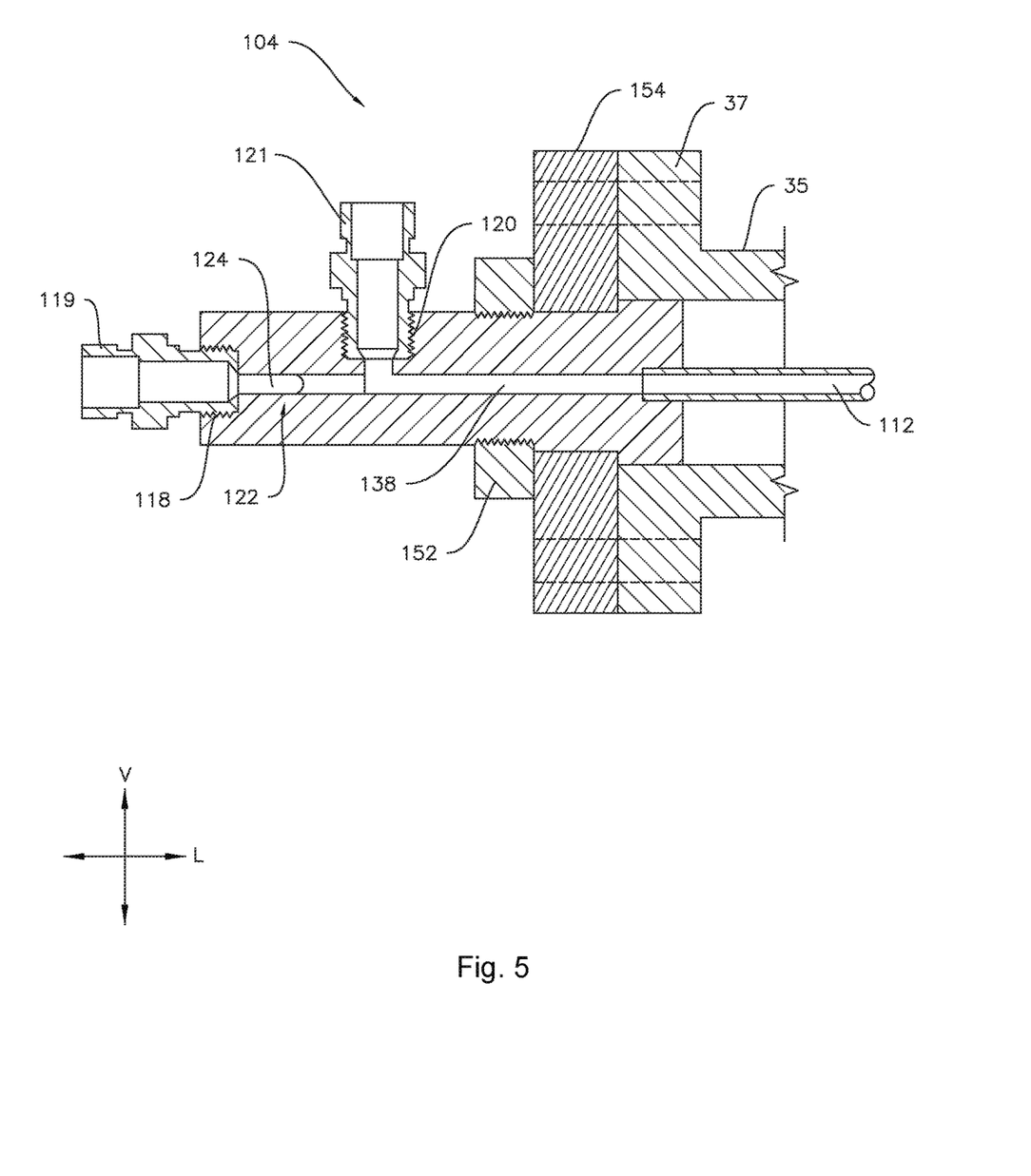
FIG. 5 is a side section view of an inlet manifold according to at least one embodiment of the present disclosure.
Figure 6:
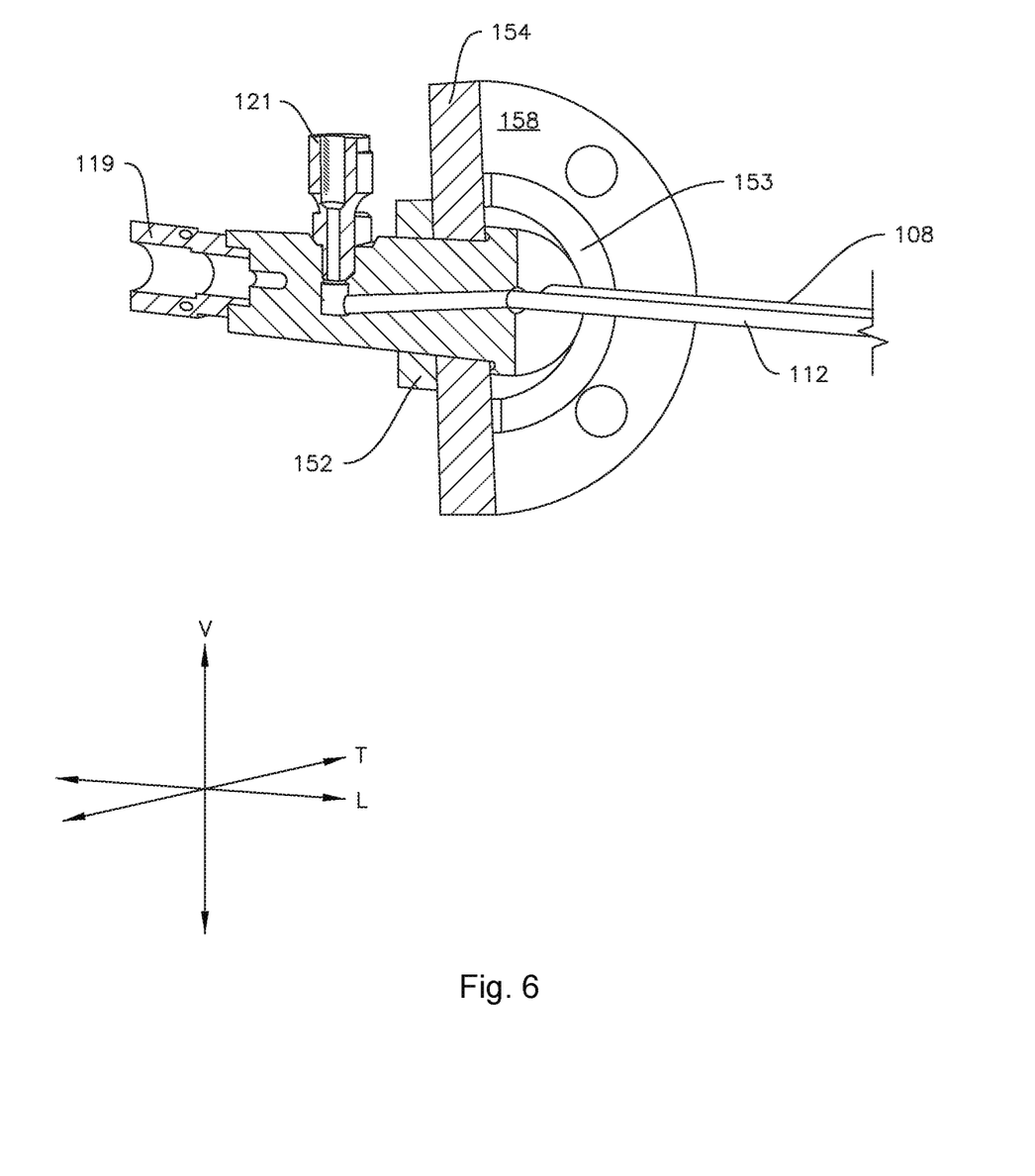
FIG. 6 is a partially sectioned perspective view of the inlet manifold of FIG. 5.
Figure 7:
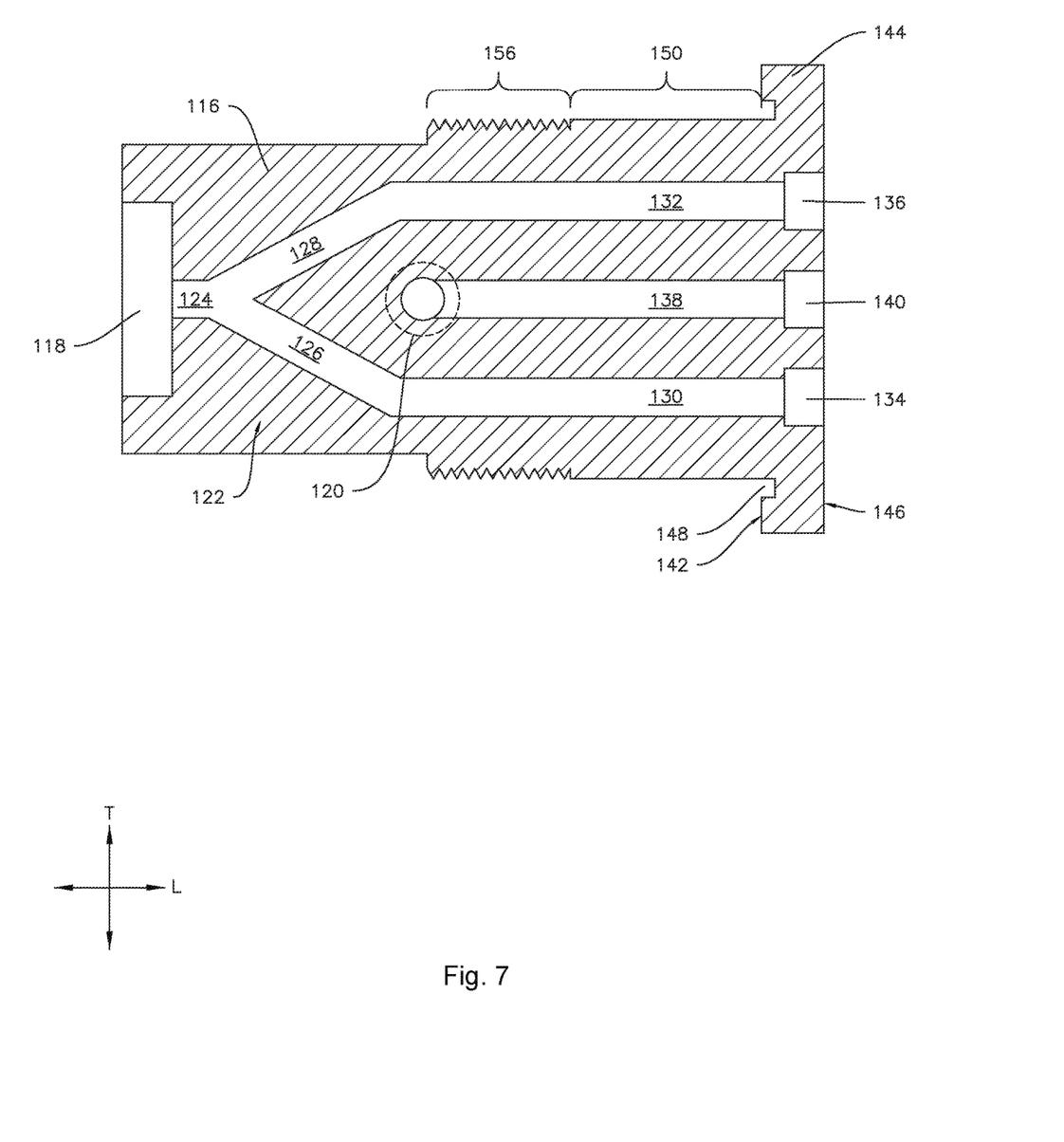
FIG. 7 is a top-down section view of the inlet manifold of FIG. 5.

FIGS. 4 and 5 illustrate various example embodiments of the inlet manifold 104. As illustrated, the inlet manifold 104 defines a longitudinal direction L, a vertical direction V, and a transverse direction T (FIG. 7). The longitudinal direction L, the transverse direction T, and the vertical direction V are mutually perpendicular (FIG. 6). The inlet manifold includes a central body 116. A main inlet 118 may be formed in the central body 116 and oriented along the longitudinal direction L. A main inlet fitting 119 may be provided in the main inlet 118, e.g., as illustrated, the main inlet fitting 119 may be threadedly engaged with the main inlet 118. A pilot inlet 120 may be formed in the central body 116 downstream of the main inlet 118 and perpendicular to the main inlet 118, e.g., as illustrated, the pilot inlet 120 may be oriented along the vertical direction V. A pilot inlet fitting 121 may be provided in the pilot inlet 120, e.g., as illustrated, the pilot inlet fitting may be threadedly engaged with the pilot inlet 120.

As best seen in the illustration of FIG. 7, some example embodiments may include a wye passage 122 defined in the central body 116 immediately downstream of the main inlet 118. The wye passage 122 includes an inlet branch 124, and the inlet branch 124 is in fluid communication with the main inlet 118. A first main passage 130 may be defined within the central body 116, in fluid communication with a first outlet branch 126 of the wye passage 122. As illustrated in FIGS. 4 through 7, in various example embodiments, the first main passage 130 extends generally along the longitudinal direction L between the wye passage 122 and a first main outlet 134 formed in the central body 116. A second main passage 132 may be defined within the central body 116, in fluid communication with a second outlet branch 128 of the wye passage 122. Also illustrated in FIGS. 4 through 7, in various example embodiments, the second main passage 132 extends generally along the longitudinal direction L between the wye passage 122 and a second main outlet 136 formed in the central body 116 (FIG. 7). A pilot passage 138 may be defined within the central body 116. The pilot passage 138 may be in fluid communication with the pilot inlet 120 and the pilot passage 138 may extend generally along the longitudinal direction L between the pilot inlet 120 and a pilot outlet 140 formed in the central body 116 (FIG. 7). As used herein, terms of approximation, such as "about," "generally," or "approximately," refer to being within ten percent above or below a stated value. Further, as used herein, such terms in the context of an angle or direction include within ten degrees of the stated angle or direction.

Figure 9:
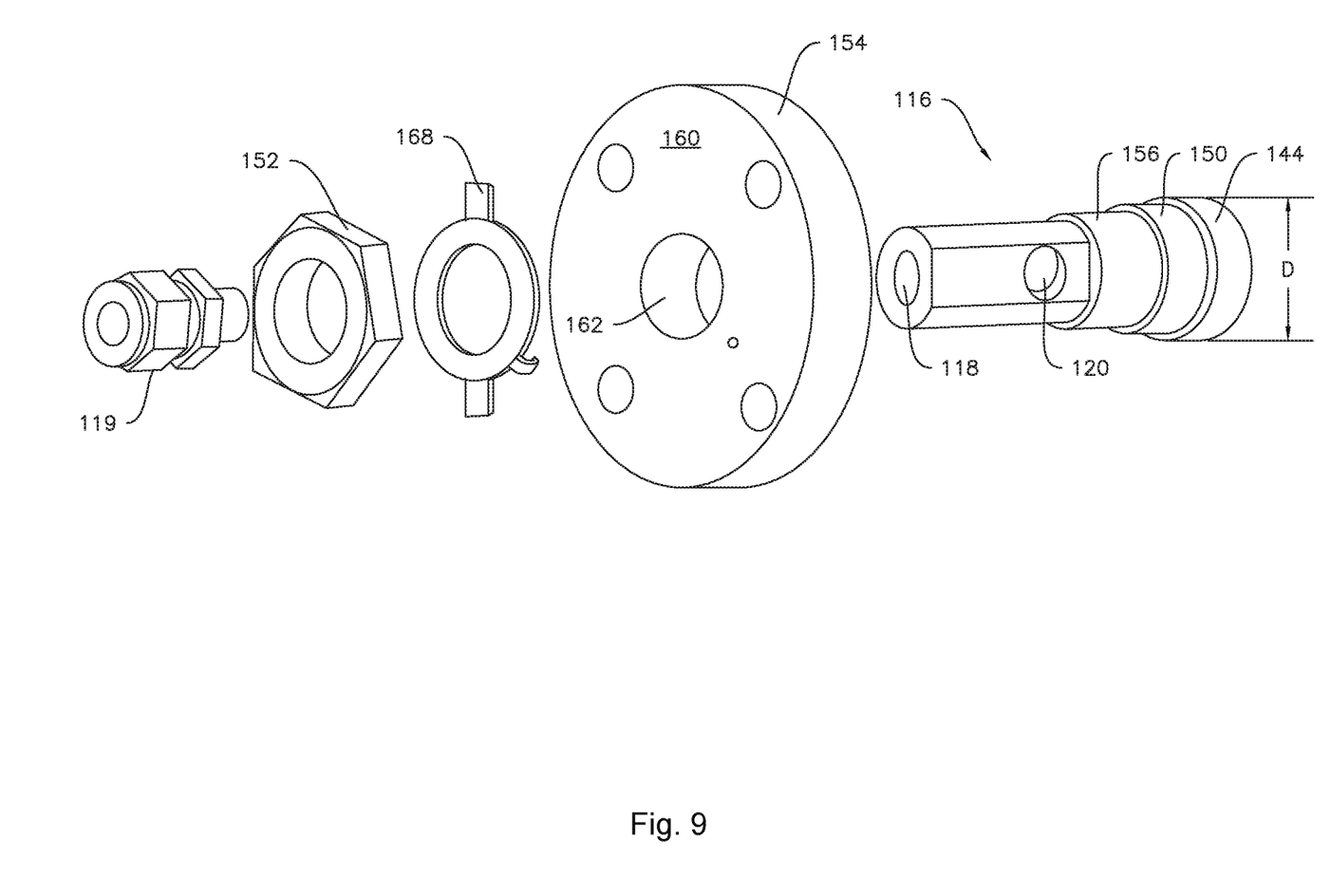
FIG. 9 is an exploded view of an inlet manifold according to at least one embodiment of the present disclosure.

As best seen in FIG. 7, the main inlet 118 of the inlet manifold 104 may be positioned at an upstream end of the central body 116. The inlet manifold 104 may further include an aft flange 144 at a downstream end of the central body 116. As illustrated, the downstream end of the central body 116 is opposite the upstream end of the central body 116 along the longitudinal direction L. As illustrated in FIG. 7, in some example embodiments, the first main outlet 134, the second main outlet 136, and the pilot outlet 140 may be formed in a downstream face 146 of the aft flange 144.

In various embodiments, the aft flange 144 defines a diameter D (FIG. 9), and the first main outlet 134, the second main outlet 136, and the pilot outlet 140 may be aligned along the diameter D of the aft flange 144. In various embodiments, the first main passage 130, the second main passage 132, and the pilot passage 138 may be aligned, e.g., each of the passages 130, 132, and 138 may extend generally along the longitudinal direction L and may be aligned along one of the vertical direction V or the transverse direction T. Such arrangement of the passages 130, 132, and 138 may advantageously promote a compact overall size of the central body 116. For example, such compactness may advantageously permit the fuel supply assembly 102 to be installed in fuel nozzle 100 from an upstream end thereof, e.g., the central body 116 of the inlet manifold 104 may be able to pass through the end cover 36 and/or a fuel port 35 defined in the end cover 36.

As best seen in FIG. 4, the inlet manifold 104 may be coupled to the various liquid fuel supply conduits to supply liquid fuel to the fuel manifold 110. For example, a first main conduit 106 may be coupled to the first main outlet 134 of the inlet manifold 104. A second main conduit 108 may be coupled to the second main outlet 136 of the inlet manifold 104. A pilot conduit 112 may be coupled to the pilot outlet 140 of the inlet manifold 104. As illustrated in FIG. 3, the first main conduit 106 may extend from the inlet manifold 104 to the fuel manifold 110. The second main conduit 108 may extend from the inlet manifold 104 to the fuel manifold 110. The pilot conduit 112 may extend from the pilot outlet 140 to the pilot tip 114. The pilot tip 114 may be positioned downstream of the fuel manifold 110.

Also illustrated for example in FIG. 7, the central body 116 of the inlet manifold 104 may include a hub portion 150 upstream of the aft flange 144. The central body 116 may further include an externally threaded portion 156 upstream of the hub portion 150. As illustrated for example in FIGS. 4 through 6, the inlet manifold 104 may further include a removable flange 154 configured for mounting on the hub portion 150 of the central body 116. The inlet manifold 104 may further include an internally threaded fastener 152 configured to engage the externally threaded portion 156 of the central body 116 to secure the removable flange 154 to the central body 116.

Figure 10:
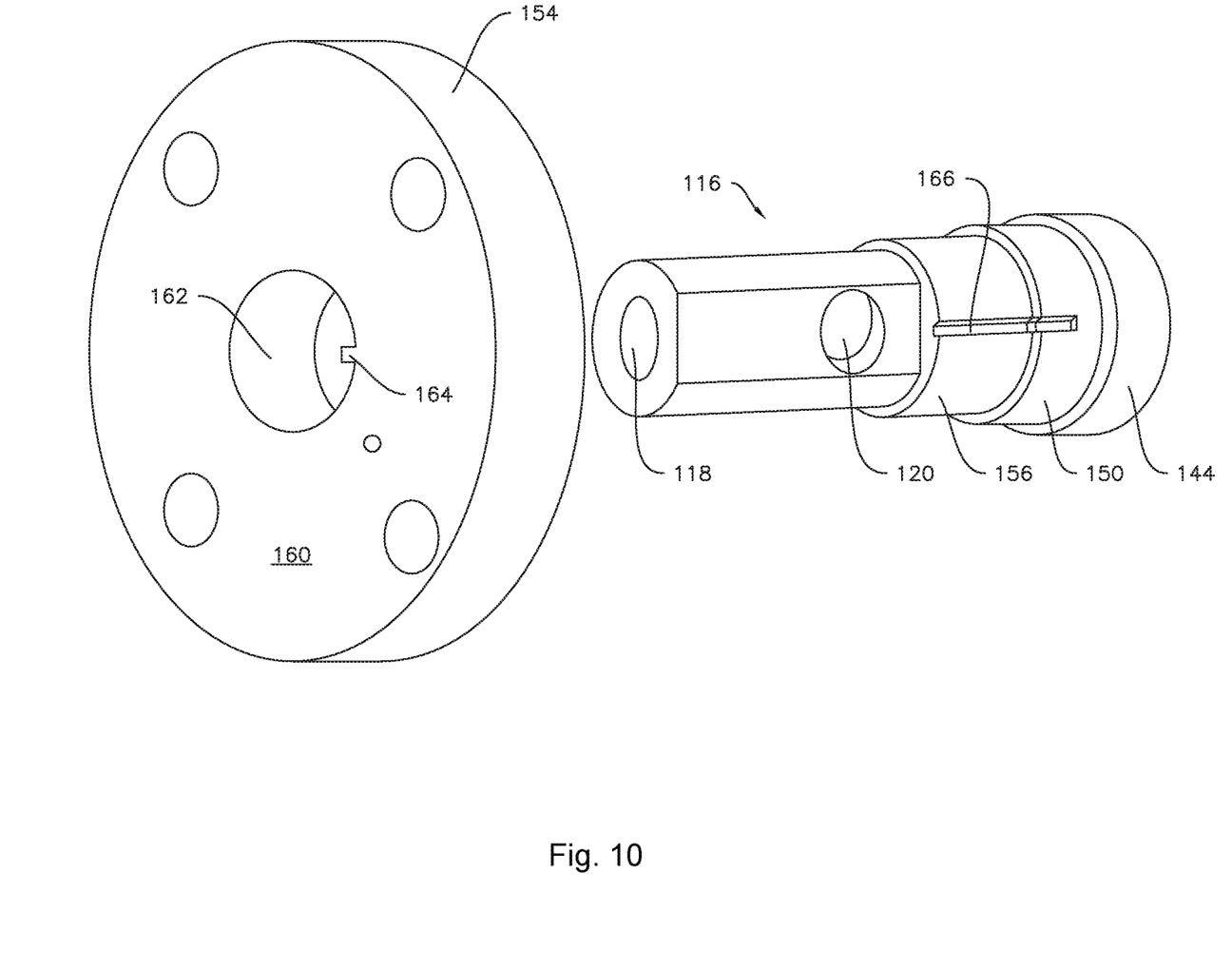
FIG. 10 is an exploded view of a portion of the inlet manifold of FIG. 9.

As noted above, the removable flange 154 may be configured for mounting on the hub portion 150 of the central body 116. For example, as illustrated in FIG. 9, the removable flange 154 may include a central aperture 162 defining an inner diameter and the hub portion 150 may be cylindrical in shape with a smooth outer surface defining an outer diameter sized to be received within the central aperture 162 of the removable flange 154. In some embodiments, for example as illustrated in FIG. 10, the hub portion 150 of the inlet manifold 104 may include a groove 166 and the removable flange 154 may include a spline 164 in the aperture 162. For example, in some embodiments such as illustrated in FIG. 10, the aperture 162 may be generally cylindrical and may define a radial direction and a circumferential direction along an outer circumference of the aperture 162. Further, the spline 164 may be positioned along the outer circumference of the aperture 162 and may extend radially inward therefrom. In various embodiments, the aperture 162 may be configured to receive the hub portion 150 of the central body 116 when the spline 164 is aligned with the groove 166. Accordingly, relative rotation between the removable flange 154 and the central body 116 may be restrained. Also as illustrated in FIG. 10, the groove 166 may extend through the externally threaded portion 156 of the central body 116 as well. In other embodiments, it is also possible to provide the hub portion with an outer diameter sufficiently larger than an outer diameter of the externally threaded portion 156 such that the spline 164 passes over threads of the externally threaded portion 156 without the need to interrupt the threads, e.g., without groove 166 extending into the externally threaded portion 156.

The removable flange 154 may include a downstream face 158 (FIG. 6) and an upstream face 160 (FIG. 9) opposite the downstream face 158. As illustrated in FIG. 7, the aft flange 144 may include an upstream face 142 and a seal groove 148 formed in the upstream face 142. In some embodiments, the seal groove 148 may be configured for retaining a sealing member (not shown) therein. As is generally understood by those of skill in the art, the sealing member may comprise a spring metal material, e.g., in a C-shaped cross-section, such as may be referred to as a C-seal. The sealing member may sealingly engage the upstream face 142 of the aft flange 144 and the downstream face 158 of the removable flange 154.

Additional anti-rotation features may be provided, for example, as illustrated in FIG. 9, a tab washer 168 may be provided. As is generally understood in the art, the tab washer 168 may include a projecting tab configured to engage with a corresponding hole in the upstream face 160 of the removable flange 154, as illustrated in FIG. 9.

As illustrated in FIG. 6, an annular sealing element 153 may be positioned on the downstream face 158 of the removable flange 154 such that the annular sealing element 153 projects downstream from the removable flange 154. The annular sealing element 153 may be configured to sealingly engage a flange 37 (FIGS. 4 and 5) of a fuel port 35 in endcover 36 of the combustor 16. In some embodiments, the annular sealing element 153 may be integrally joined with the removable flange 154. In other embodiments, e.g., as illustrated in FIG. 6, the annular sealing element 153 may be a separate removable piece, e.g., a gasket, positioned between the downstream face 158 of the removable flange 154 and the fuel port 35 (FIGS. 4 and 5). As may be seen in FIG. 6, in an assembled position, the annular sealing element 153 surrounds the aft flange 144 of the central body 116. For example, the aft flange 144 may define a maximum outer diameter D (FIG. 9) and the annular sealing element 153 may define an inner diameter, such that the maximum outer diameter D of the aft flange 144 may be less than the inner diameter of the annular sealing element 153.

Figure 8:
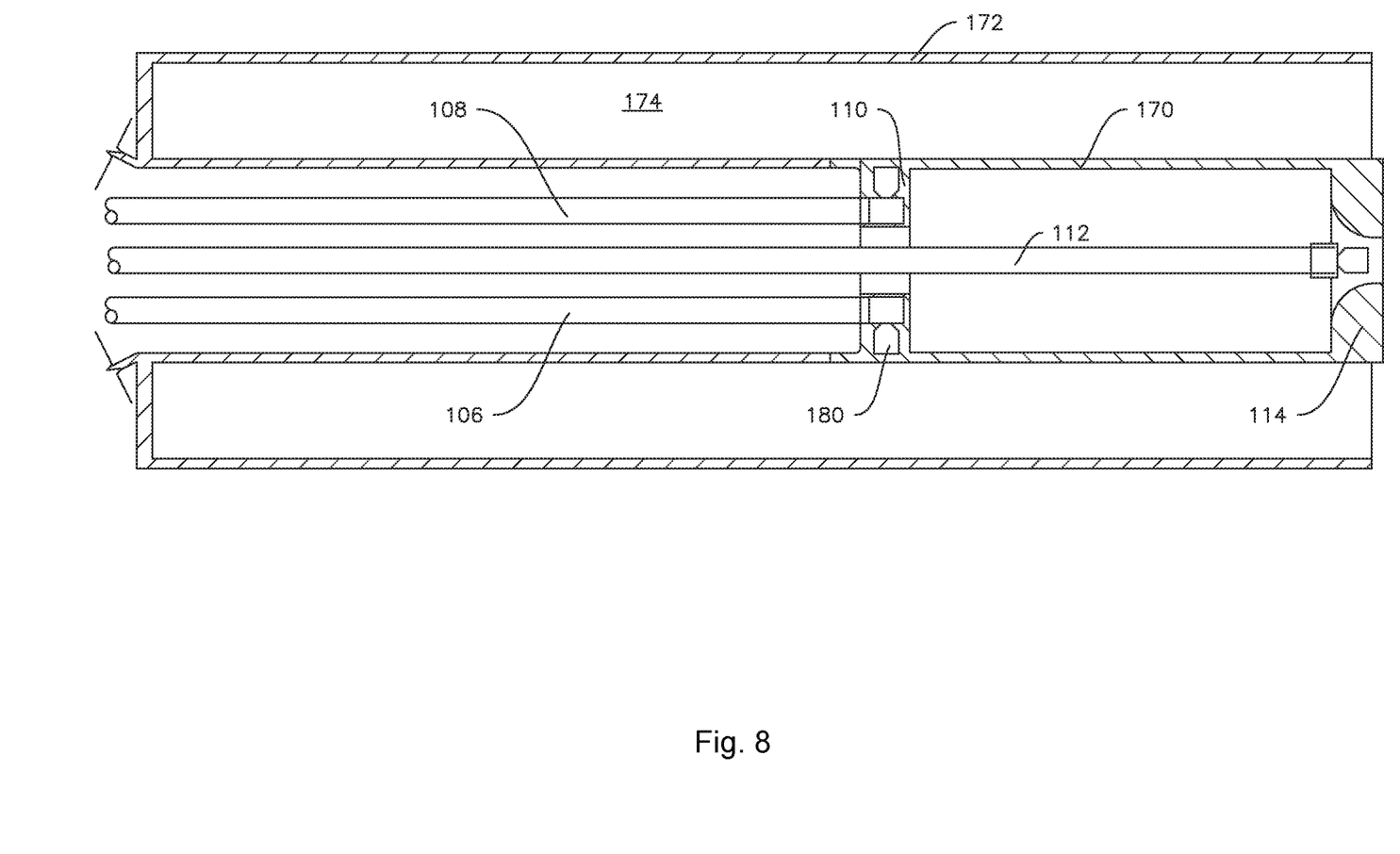
FIG. 8 is a section view of a portion of the fuel nozzle of FIG. 3.

FIG. 8 provides a cross-sectional side view of a downstream portion of an exemplary fuel nozzle 100 according to at least one embodiment of the present disclosure. As shown in FIG. 8, the fuel nozzle 100 includes a center tube 170. In particular embodiments, the fuel nozzle 100 may include an outer sleeve or burner tube 172 that extends circumferentially around at least a portion of the center tube 170. An air plenum 174 is defined between the center tube 170 and the outer sleeve 172. In particular embodiments, the outer sleeve 172 may include one or more apertures (not shown) through which compressed air 26 may flow into the air plenum 174.

Embodiments of the present disclosure include a method of assembling a fuel nozzle 100. The method includes initially forming the fuel supply assembly 102. The initially formed fuel supply assembly 102 may include the pilot tip 114, the fuel manifold 110, the first main supply conduit 106, the second main supply conduit 108, the pilot supply conduit 112, and at least a portion of the inlet manifold 104, e.g., at least the central body 116 of the inlet manifold 104. Initially forming the fuel supply assembly 102 may include attaching a first end of first main conduit 106 to the fuel manifold 110 and attaching a first end of second main conduit 108 to the fuel manifold 110 as well as attaching a second end of first main conduit 106 to the first main outlet 130 of the central body 116 of the inlet manifold 104 and attaching a second end of the second main conduit 108 to the second main outlet 136 of the central body 116 of the inlet manifold 104. Initially forming the fuel supply assembly 102 further includes attaching a first end of the pilot conduit 112 to the pilot tip 114 and attaching a second end of the pilot conduit 112 to the pilot outlet 140 of the central body 116 of the inlet manifold 104. As illustrated, the pilot tip 114 is downstream of the fuel manifold 110. The method then includes inserting the central body 116 of the inlet manifold 104 into a downstream end of a fuel nozzle, passing the central body 116 upstream through the fuel nozzle 100 and through an endcover 36 until the pilot tip 114 is proximate to the downstream end of the fuel nozzle 100, e.g., in the position shown in FIGS. 3 and 8. Assembly and installation of the fuel nozzle 100 may then be completed by assembling the inlet manifold 104 and securing the inlet manifold 104 to the end cover 36. For example, some embodiments may include placing the removable flange 154 onto the hub portion 150 of the central body 116 of the inlet manifold 104, and securing the removable flange 154 to the endcover 36. Some embodiments may further include securing the removable flange 154 on the hub portion 150 of the central body 116 with an internally threaded fastener 152.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A fuel supply assembly for a fuel nozzle, the fuel supply assembly comprising:

an inlet manifold defining a longitudinal direction, a transverse direction, and a vertical direction, the longitudinal direction, the transverse direction, and the vertical direction are mutually perpendicular, the inlet manifold comprising:

a main inlet positioned at an upstream end of the inlet manifold and oriented along the longitudinal direction;

an aft flange at a downstream end of the inlet manifold, the aft flange defining a diameter, the downstream end of the inlet manifold opposite the upstream end of the inlet manifold along the longitudinal direction;

a pilot inlet oriented along the vertical direction;

a wye passage comprising an inlet branch, the inlet branch in fluid communication with the main inlet of the inlet manifold;

a first main passage in fluid communication with a first outlet branch of the wye passage, the first main passage extending generally along the longitudinal direction between the wye passage and a first main outlet;

a second main passage in fluid communication with a second outlet branch of the wye passage, the second main passage extending generally along the longitudinal direction between the wye passage and a second main outlet; and a pilot passage in fluid communication with the pilot inlet, the pilot passage extending generally along the longitudinal direction between the pilot inlet and a pilot outlet;

wherein the first main outlet, the second main outlet, and the pilot outlet are formed in a downstream face of the aft flange and are aligned along the diameter of the aft flange;

a first main conduit coupled to the first main outlet of the inlet manifold, the first main conduit extending between the inlet manifold and a fuel manifold;

a second main conduit coupled to the second main outlet of the inlet manifold, the second main conduit extending between the inlet manifold and the fuel manifold, the fuel manifold in fluid communication with an air plenum for mixing fuel from the first main conduit and the second main conduit with air in the air plenum; and a pilot conduit coupled to the pilot outlet of the inlet manifold, the pilot conduit extending between the pilot outlet and a pilot tip, the pilot tip positioned downstream of the fuel manifold.

2. The fuel supply assembly of claim 1, further comprising a central body of the inlet manifold, wherein the main inlet, the pilot inlet, the first main outlet, the second main outlet, the pilot outlet, and the aft flange are formed in the central body.

3. The fuel supply assembly of claim 2, wherein the central body of the inlet manifold further comprises a hub portion upstream of the aft flange, and the inlet manifold further comprises a removable flange configured for mounting on the hub portion of the central body.

4. The fuel supply assembly of claim 3, wherein the hub portion of the inlet manifold comprises a groove and the removable flange comprises an aperture and a spline in the aperture, the aperture configured to receive the hub portion of the central body when the spline is aligned with the groove, whereby relative rotation between the removable flange and the central body is restrained.

5. The fuel supply assembly of claim 3, wherein the removable flange comprises a downstream face, the aft flange comprises an upstream face and a seal groove formed in the upstream face of the aft flange, the seal groove configured for retaining a sealing member therein.

6. The fuel supply assembly of claim 3, wherein the central body comprises an externally threaded portion upstream of the hub portion, and the inlet manifold further comprises an internally threaded fastener configured to engage the externally threaded portion to secure the removable flange to the central body.

7. An inlet manifold defining a first direction, a second direction, and a third direction, the first direction, the second direction, and the third direction are mutually perpendicular, the inlet manifold comprising:

a main inlet positioned at an upstream end of the inlet manifold and oriented along the first direction;

an aft flange at a downstream end of the inlet manifold, the downstream end of the inlet manifold opposite the upstream end of the inlet manifold along the first direction;

a pilot inlet oriented along the third direction;

a wye passage in fluid communication with the main inlet of the inlet manifold;

a first main passage in fluid communication with the wye passage, the first main passage extending between the wye passage and a first main outlet;

a second main passage in fluid communication with the wye passage, the second main passage extending between the wye passage and a second main outlet;

a pilot passage in fluid communication with the pilot inlet, the pilot passage extending between the pilot inlet and a pilot outlet;

a central body comprising a hub portion upstream of the aft flange and an externally threaded portion upstream of the hub portion, wherein the main inlet, the pilot inlet, the first main outlet, the second main outlet, the pilot outlet, and the aft flange are formed in the central body;

a removable flange configured for mounting on the hub portion of the central body; and an internally threaded fastener configured to engage the externally threaded portion to secure the removable flange to the central body;

wherein the first main outlet, the second main outlet, and the pilot outlet are formed in a downstream face of the aft flange.

8. The inlet manifold of claim 7, wherein the wye passage comprises an inlet branch, first outlet branch and a second outlet branch, the inlet branch in fluid communication with the main inlet of the inlet manifold, the first main passage in fluid communication with the first outlet branch of the wye passage, and the second main passage in fluid communication with the second outlet branch of the wye passage.

9. A method of assembling a fuel nozzle comprising;

attaching a first end of a first main conduit to a fuel manifold;

attaching a second end of the first main conduit to a first main outlet of a central body of an inlet manifold, the inlet manifold defining a first direction, a second direction, and a third direction, the first direction, the second direction, and the third direction are mutually perpendicular, the first main outlet formed in a downstream face of an aft flange at a downstream end of the inlet manifold;

attaching a first end of a second main conduit to the fuel manifold;

attaching a second end of the second main conduit to a second main outlet of the central body of the inlet manifold, the second main outlet formed in the downstream face of the aft flange;

attaching a first end of a pilot conduit to a pilot tip, the pilot tip downstream of the fuel manifold;

attaching a second end of the pilot conduit to a pilot outlet of the central body of the inlet manifold, the pilot outlet formed in the downstream face of the aft flange;

inserting the central body into a downstream end of a fuel nozzle;

passing the central body upstream through the fuel nozzle and through an endcover until the pilot tip is proximate to the downstream end of the fuel nozzle;

placing a removable flange onto a hub portion of the central body;

securing the removable flange on the hub portion of the central body with an internally threaded fastener by threading the internally threaded fastener onto an externally threaded portion of the central body upstream of the hub portion;

securing the removable flange to the endcover;

fastening a main inlet fitting into a main inlet port positioned at an upstream end of the central body of the inlet manifold and oriented along the first direction; and fastening a pilot inlet fitting into a pilot inlet port of the central body, the pilot inlet port oriented along the third direction;

wherein the downstream end of the inlet manifold is opposite the upstream end of the inlet manifold along the first direction, and wherein the inlet manifold further comprises a wye passage in fluid communication with the main inlet of the inlet manifold, a first main passage in fluid communication with the wye passage, the first main passage extending between the wye passage and the first main outlet, a second main passage in fluid communication with the wye passage, the second main passage extending between the wye passage and the second main outlet, and a pilot passage in fluid communication with the pilot inlet, the pilot passage extending between the pilot inlet and the pilot outlet.

\* \* \* \* \*